Aug. 10, 1926.　　　　　　　　　　　　　　　　1,595,439
J. E. WILSON ET AL
PREPARATION OF DOUGH FOR THE MAKING OF BREAD
Filed March 5, 1925
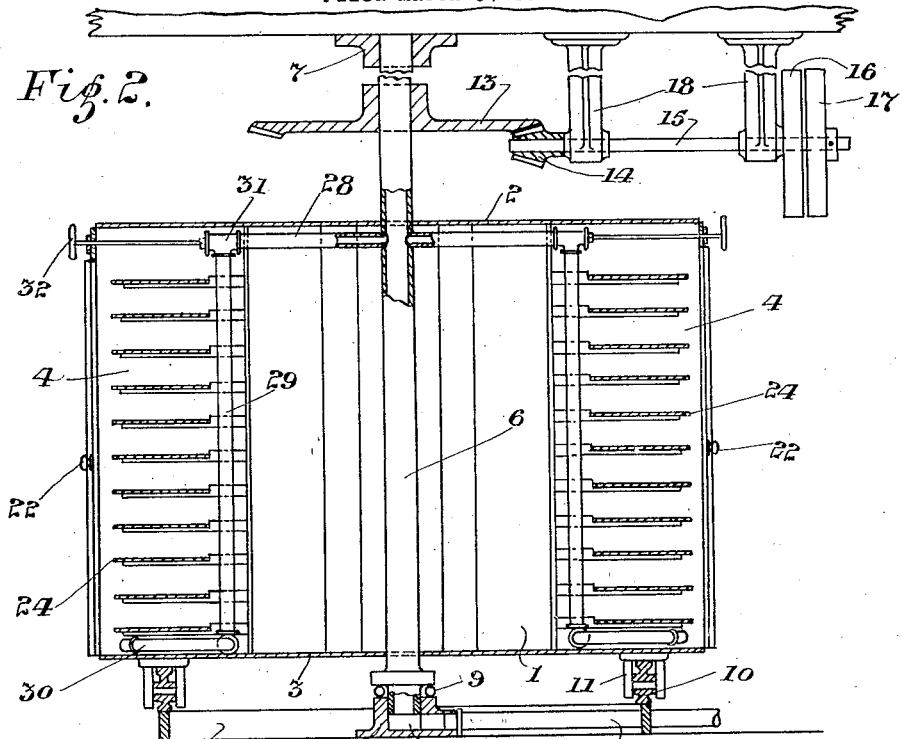
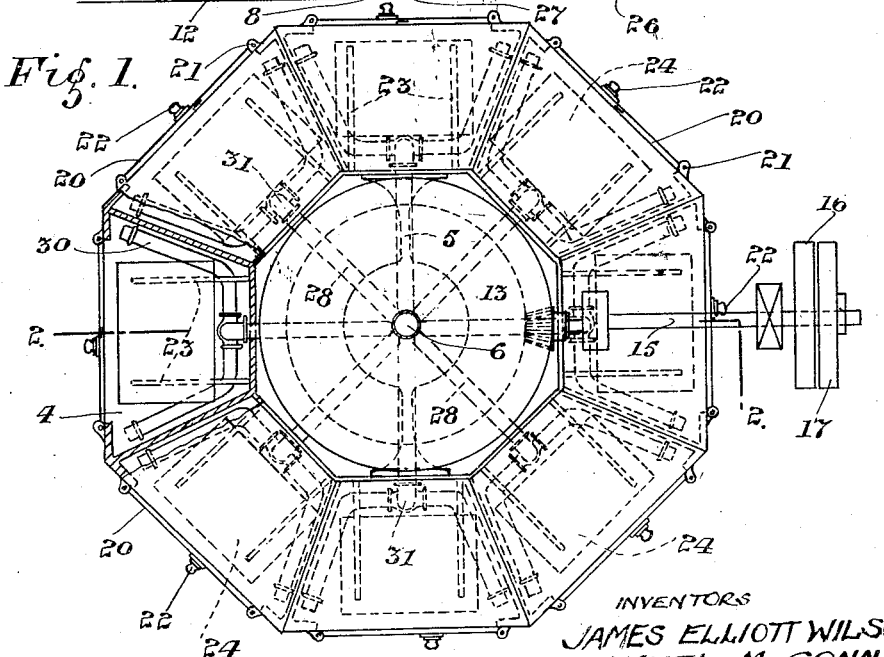
INVENTORS
JAMES ELLIOTT WILSON,
SAMUEL McCONNELL,
AND CAMPBELL BROWN
By John C. Brady
Attorney.

Patented Aug. 10, 1926.

1,595,439

UNITED STATES PATENT OFFICE.

JAMES ELLIOTT WILSON, SAMUEL McCONNELL, AND CAMPBELL BROWN, OF BELFAST, IRELAND.

PREPARATION OF DOUGH FOR THE MAKING OF BREAD.

Application filed March 5, 1925, Serial No. 13,181, and in Great Britain January 19, 1925.

This invention relates to the proving or fermentation of dough, or dough mixture, in the manufacture of bread, and has for its object to provide an improved proving press to be used for proving or fermentation purposes, to be brought into use between the dough making operation and the baking.

According to this invention the press comprises a structure having a plurality of compartments each of which compartments are adapted to receive carriers for the dough; the structure being movable so that when one compartment is filled the structure can be moved to bring another compartment into position for filling.

A press according to this invention comprises a cylindrical, rectangular or prismatic structure mounted for rotation about its axis and having compartments in its sides, the compartments being adapted to receive the dough carrying members all so arranged that the compartments are brought successively into a position to receive the dough by rotation of the structure.

Means may be provided for introducing steam to the compartments during the movement of the structure.

In order that this invention may be more clearly understood and more readily carried into practice, we have appended hereunto one sheet of drawings illustrating the same, wherein:—

Fig. 1 is a plan view of a proving press according to this invention.

Fig. 2 is a sectional elevation on line 2—2 Fig. 1.

In the construction shown upon the accompanying drawings which illustrates by way of example a preferred construction of the invention, the proving press comprises a structure 1 of right prismatic form. The structure comprises upper and lower end plates 2, 3, between which are located a series of compartments 4 disposed around the sides of the structure.

This structure is mounted to rotate about its axis by means of the bearing 5 which is fixed upon the member 6. This member 6 is rotatably mounted in bearings 7 and 8 and in the construction illustrated the whole apparatus is arranged to revolve about a vertical axis and therefore a thrust bearing shown diagrammatically and indicated at 9, is provided between the member 6 and the lower bearing 8. The structure is also provided at spaced intervals with a series of rollers 10 rotatably mounted upon the lugs 11 fixed to the under side of the structure adjacent to the periphery thereof and these rollers are adapted to run on the annular rail 12. The structure is rotated by means of the large bevel pinion 13 which is fixed on the upper member 6 and which meshes with the pinion 14 mounted upon the shaft 15 and provided with fast and loose pulleys 16 and 17 respectively by which it is connected by belt transmission to any suitable prime mover. The shaft 15 is supported by the brackets 18.

The compartments of the movable structure are provided with doors 20, hinged at 21, and provided with a knob 22 by which they can be opened. These compartments are provided interiorly with horizontally disposed brackets 23 adapted to receive and detachably support the trays 24. These trays are adapted to receive the dough and carry it during the proving operation.

As previously stated, means may be provided for introducing steam to the compartments if so desired. In the construction illustrated steam from a suitable source is passed through the pipe 26 and through the opening 27 in the bearing 8 into the axle member 6 which is formed as a tube so as to provide a conduit for the passage of the steam. From the upper end of the axle member 6 steam is conveyed to each compartment by a radially extending pipe 28 and by a pipe 29 which extends downwardly through the compartments to the bifurcated ends 30 arranged in the bottom of the compartments. These bifurcated end members would be provided with suitable orifices through which the steam could pass. A valve chest 31 is provided between the pipes 28 and 29; this valve chest containing the valve to control the passage of steam to the individual compartments, the valve being operated by the hand-wheel 32.

In operation the structure is disposed between the dough making plant and the automatic baking plant or oven, and is so arranged that the compartments can be brought successively into a position adjacent to the dough making plant and the oven. The person in charge of the dough making plant places the dough which is situated on the trays 24 into the nearest compartment, and when this is full he rotates the structure to bring the next compartment into position.

It will be understood that before rotating the structure he closes the doors of the compartments and may operate the valve to introduce the steam thereto. He then proceeds to fill the succeeding compartments in a similar manner. Thus, after each compartment is filled, the structure is rotated so that the tray carrying the dough is moved round with the structure and when this arrives at a position opposite the automatic baking plant or oven, the operator in charge thereof after having cut off the steam, opens the doors of the compartments and removes the trays carrying the dough and transfers them to the baking plant or oven. Each succeeding compartment as it is brought into position is treated in this manner by both the operator in charge of the dough making plant and the operator in charge of the baking plant or oven and the apparatus can be so arranged that the time taken in moving any particular compartment of the structure from the position in which the dough is fed into it, to the position in which the dough is removed, is just sufficient to effect the proving or fermentation of the dough.

Now it will be understood that although we have described a preferred arrangement the apparatus could be modified in many respects. For instance, instead of arranging the structure to turn about a vertical axis it may be arranged to rotate about a horizontal axis, but in the latter case the trays would have to be so supported in the structure that they would always remain in substantially the same horizontal position. Further, it will be understood that although we have described the structure as being intermittently rotated it may be arranged to be continuously rotated and it may be arranged to suit either hand baking or automatic plant work.

Further, it will be understood that the time taken by the movement of the compartment from one position in which the dough is placed therein to the position in which the dough is removed can be regulated by varying the time taken by the movable member in completing its cycle and further that this cycle can be varied by feeding the goods into and removing them from alternate compartments so that the structure makes two cyclic movements between the time of feeding the goods to any particular compartment and the removal of the goods from that particular compartment. Further, it will be understood that the time taken by the cycle can be varied by loading and unloading the compartments at different points.

A proving press according to this invention is an advantage in that it effects a great saving of space and provides for the delivery of the goods at or adjacent to the mouth of the oven. Moreover, the press is particularly suitable for use in connection with travelling ovens.

Having now fully described our invention what we claim and desire to secure by Letters Patent is:—

1. A proving press comprising a press structure having a plurality of compartments; means for movably mounting said structure; means in said compartments to receive and support the dough and means for supplying steam to said compartments.

2. A proving press comprising a structure having compartments in its sides; a hollow axially disposed trunnion for rotatably mounting said structure, said trunnion having conduits extending radially outwards to communicate with the compartments for the purpose of supplying steam thereto and means in said compartments to receive and support the dough.

In testimony whereof we affix our signatures.

JAMES ELLIOTT WILSON.
SAMUEL McCONNELL.
CAMPBELL BROWN.